R. C. MOREY.
SHOCK ABSORBER.
APPLICATION FILED AUG. 18, 1919.
1,339,780.
Patented May 11, 1920.
2 SHEETS—SHEET 2.
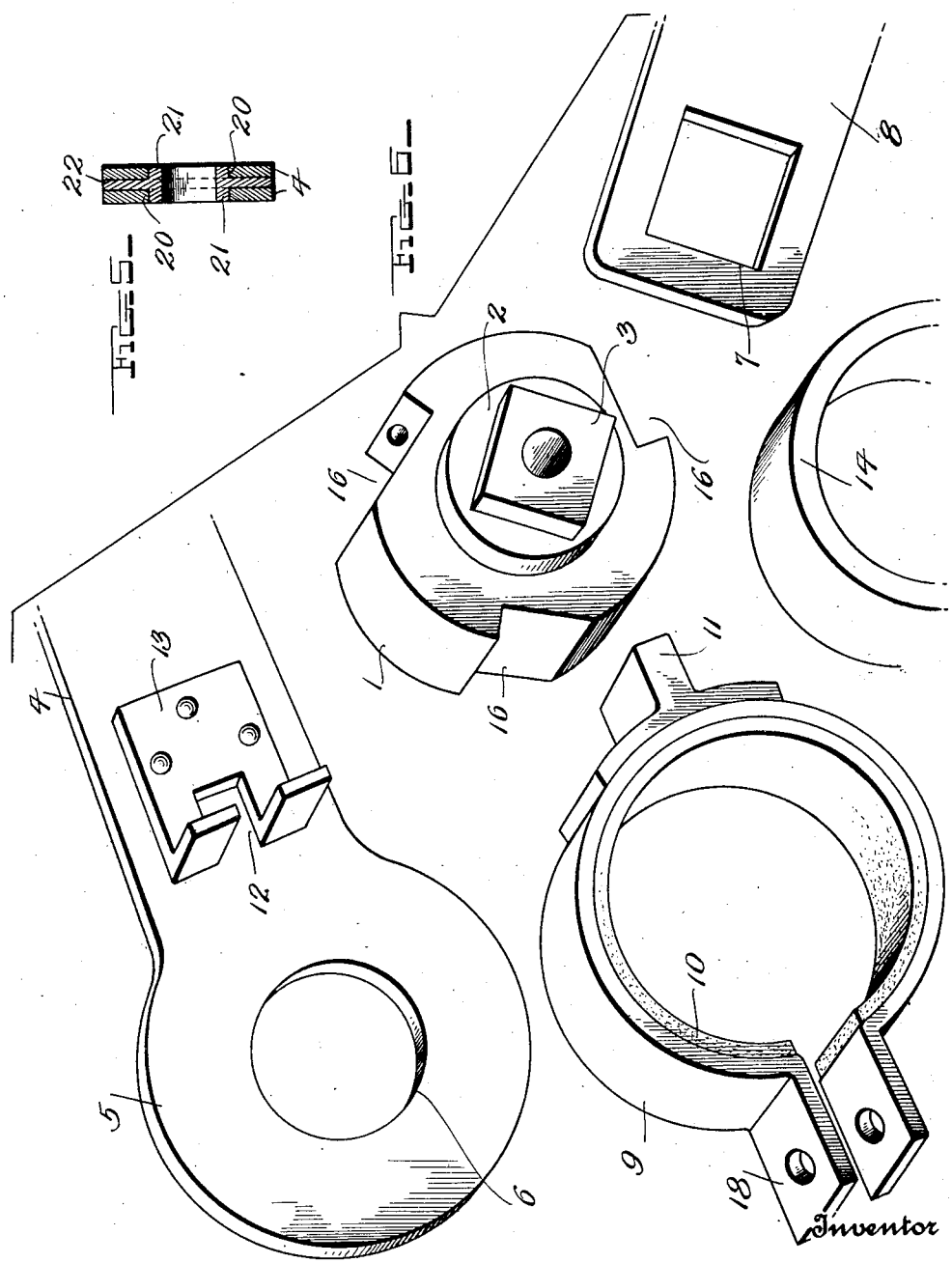
Witness
J. R. Pierce
Inventor
R. C. Morey
By H. B. Willson & Co.
Attorneys

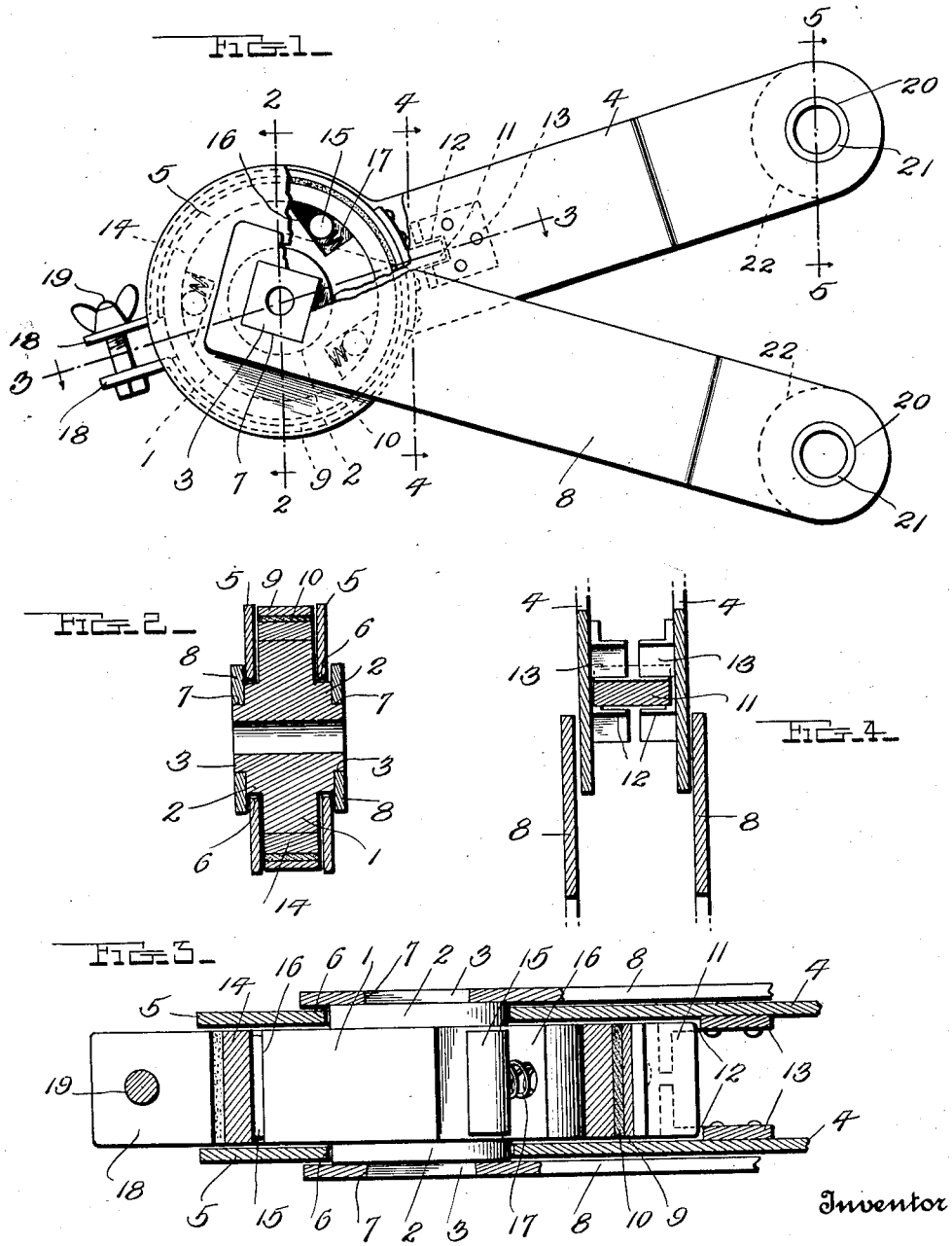

UNITED STATES PATENT OFFICE.

ROY C. MOREY, OF LINCOLN, NEBRASKA.

SHOCK-ABSORBER.

1,339,780.  Specification of Letters Patent.  Patented May 11, 1920.

Application filed August 18, 1919. Serial No. 318,225.

*To all whom it may concern:*

Be it known that I, ROY C. MOREY, a citizen of the United States, residing at Lincoln, in the county of Lancaster and State of Nebraska, have invented certain new and useful Improvements in Shock-Absorbers; and I do declare the following to be a full, clear, and exact description of the invention, such as will enable others skilled in the art to which it appertains to make and use the same.

My invention has for its object to provide an extremely simple and inexpensive, yet a highly efficient and desirable shock absorber for vehicles, the present form of the invention being designed to absorb the rebound or recoil of the usual springs.

With the foregoing in view, the invention resides in the novel construction and arrangement of parts hereinafter described and claimed, the descriptive matter being supplemented by the accompanying drawings.

Figure 1 is a side elevation of the device partly broken away.

Fig. 2 is a vertical transverse section on the plane of the line 2—2 of Fig. 1.

Fig. 3 is a horizontal section on the plane of the line 3—3 of Fig. 1.

Figs. 4 and 5 are detail vertical transverse sections on the planes indicated by the lines 4—4 and 5—5 of Fig. 1.

Fig. 6 is a disassembled perspective view.

In the drawing above briefly described, the numeral 1 designates a rotary core member having projecting circular bosses 2 at its opposite sides, and poly-sided bosses 3 extending beyond said bosses 2. A pair of levers 4 having enlarged heads 5 on one end are disposed on opposite sides of the core member 1 and provided with openings 6 which receive the bosses 2 rotatably. The bosses 3 are frictionally or otherwise held in openings 7 in another pair of levers 8 which are disposed at the outer sides of the levers 4 and it will be seen that when said levers 8 move, the core member 1 will turn therewith.

A brake band 9 having a lining 10 surrounds the circular core member 1 and is provided with a radial projection 11 received in notches 12 in a pair of L-shaped brackets 13 which are riveted to the inner sides of the levers 4, and it thus follows that when these levers move, the brake band is similarly moved. A brake ring 14 is interposed between the core member 1 and the brake lining 10 to be engaged by the latter, and by means of clutch rollers 15 operating in tapered notches 16 in the periphery of said core member, said ring and member are caused to rotate bodily in one direction, although the rollers allow free movement of the core member within the ring, in the other direction. Coiled springs 17 are preferably provided for normally holding the rollers 15 in contact with both the oblique bottom walls of the notches 16 and the inner periphery of the ring 14, so that they are constantly in position to connect said ring and member for rotation in unison, when the latter is moved in the proper direction.

The brake band 9 may well be split and provided with projecting ears 18 through which an adjusting bolt 19 passes, thus permitting wear to be taken up.

The outer ends of the levers 4 and 8 are bent toward each other and provided with openings 20 receiving projecting bosses 21 on bushing disks 22 which are located between said ends, and bolts or the like may pass through said bosses for connecting the levers respectively with the vehicle body and the axle, or with other suitable parts. When the springs of the machine compress, the rollers 15 allow the core member 1 to turn freely within the ring 14, but when recoil takes place, said rollers cause said ring to turn with the core member, against the braking action of the brake lining 10, thereby effectively absorbing the recoil shock. The action of the clutch or shock absorber is instantaneous when recoil starts, no matter to what extent the vehicle spring be compressed. The device is also of advantage in preventing listing of the vehicle body in turning corners. By merely reversing the notches 16, the device may be made to absorb shocks causing compression of the springs instead of the recoil.

From the foregoing, taken in connection with the accompanying drawings, it will be obvious that although my invention is of extremely simple and inexpensive nature, it will be highly efficient and in every way desirable, and since probably the best results may be obtained from the details disclosed, they are preferably followed. Within the scope of the invention as claimed, however, numerous minor changes may well be made.

I claim:

1. In a shock absorber, a circular core member having central circular bosses projecting from its opposite sides and poly-sided bosses extending from said circular bosses, the periphery of said core member having tapered notches, a brake ring surrounding said core member, clutch rollers in said notches adapted to lock said core member and brake ring for rotation together, when said core member moves in one direction, an inner pair of levers having openings in one end rotatably receiving said circular bosses, an outer pair of levers having one end fixedly mounted on said poly-sided bosses, a brake band surrounding said brake ring and held in frictional contact therewith, and means connecting said brake band with said inner pair of levers for movement therewith.

2. In a shock absorber, a circular core member having central circular bosses projecting from its opposite sides and poly-sided bosses extending from said circular bosses, the periphery of said core member having tapered notches, a brake ring surrounding said core member, clutch rollers in said notches adapted to lock said core member and brake ring for rotation together, when said core member moves in one direction, an inner pair of levers having openings in one end rotatably receiving said circular bosses, an outer pair of levers having one end fixedly mounted on said poly-sided bosses, a brake band surrounding said brake ring and held in frictional contact therewith, a projection on said brake band between said inner pair of levers, and abutment means carried by one or both of these levers for engagement with said projection to insure movement of said inner levers and brake band in unison.

3. In a shock absorber, a circular core member having central circular bosses projecting from its opposite sides and poly-sided bosses extending from said circular bosses, the periphery of said core member having tapered notches, a brake ring surrounding said core member, clutch rollers in said notches adapted to lock said core member and brake ring for rotation together, when said core member moves in one direction, an inner pair of levers having openings in one end rotatably receiving said circular bosses, an outer pair of levers having one end fixedly mounted on said poly-sided bosses, a brake band surrounding said brake ring and held in frictional contact therewith, a projection on said brake band extending between said inner pair of levers, and an L-shaped bracket secured to one or both of these levers and having a notch receiving said projection to insure bodily movement of said inner levers and said brake band.

In testimony whereof I have hereunto set my hand.

ROY C. MOREY.